(12) United States Patent
LeBlanc et al.

(10) Patent No.: US 11,085,290 B2
(45) Date of Patent: Aug. 10, 2021

(54) DISTRIBUTED SENSING INTERROGATOR USING SINGLE-MODE FIBER FOR MULTI-MODE FIBER INTERROGATION

(71) Applicant: Halliburton Energy Services, Inc., Houston, TX (US)

(72) Inventors: Michel Joseph LeBlanc, Houston, TX (US); Jason Edward Therrien, Cypress, TX (US); Andreas Ellmauthaler, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 66 days.

(21) Appl. No.: 16/488,206

(22) PCT Filed: Jul. 31, 2018

(86) PCT No.: PCT/US2018/044696
§ 371 (c)(1),
(2) Date: Aug. 22, 2019

(87) PCT Pub. No.: WO2019/032340
PCT Pub. Date: Feb. 14, 2019

(65) Prior Publication Data
US 2020/0032645 A1    Jan. 30, 2020

Related U.S. Application Data

(60) Provisional application No. 62/543,338, filed on Aug. 9, 2017.

(51) Int. Cl.
*G01D 5/353* (2006.01)
*E21B 47/135* (2012.01)
*E21B 47/00* (2012.01)

(52) U.S. Cl.
CPC ............ *E21B 47/135* (2020.05); *E21B 47/00* (2013.01); *G01D 5/35358* (2013.01)

(58) Field of Classification Search
CPC .................................................. G01D 5/35358
See application file for complete search history.

(56) References Cited

U.S. PATENT DOCUMENTS 5,137,351 A    8/1992    So
5,137,360 A    8/1992    Ferrar
(Continued)

FOREIGN PATENT DOCUMENTS

CN    106500823 A    *    3/2017
WO    2017009606        1/2017

OTHER PUBLICATIONS

ISRWO International Search Report and Written Opinion for PCT/US2018/044696 dated Nov. 14, 2018.

*Primary Examiner* — Thanh Luu
(74) *Attorney, Agent, or Firm* — John Wustenberg; C. Tumey Law Group PLLC

(57) ABSTRACT

The subject technology relates to distributed sensing interrogation using single-mode fiber for multi-mode fiber interrogation. The subject technology includes deploying a distributed sensing tool into a wellbore, and logging the wellbore using the distributed sensing tool. The distributed sensing tool includes an optical amplifier and an optical filter coupled to a single-mode optical fiber and a multi-mode optical fiber. The optical amplifier is coupled to a single-mode circulator for amplifying a single-mode optical signal, and the optical filter is coupled to the optical amplifier for filtering the amplified single-mode optical signal. The single-mode circulator is coupleable to an interrogator for routing the single-mode optical signal to the multi-mode optical fiber and routing a reflective optical signal from the multi-mode optical fiber to the interrogator. A mode scram- (Continued)

bler is coupleable to the multi-mode optical fiber for coupling the amplified single-mode optical signal into multiple modes of the multi-mode optical fiber.

19 Claims, 5 Drawing Sheets

(56) References Cited

U.S. PATENT DOCUMENTS

| | | | |
|---|---|---|---|
| 2005/0180748 A1* | 8/2005 | Kawahata | H04B 10/071 398/16 |
| 2008/0030739 A1 | 2/2008 | Hartog et al. | |
| 2012/0274927 A1 | 11/2012 | Li et al. | |
| 2015/0114127 A1* | 4/2015 | Barfoot | G01H 9/004 73/655 |
| 2018/0284304 A1 | 10/2018 | Barfoot et al. | |

* cited by examiner

DISTRIBUTED SENSING INTERROGATOR USING SINGLE-MODE FIBER FOR MULTI-MODE FIBER INTERROGATION

CROSS-REFERENCE TO RELATED APPLICATIONS

The present application claims the benefit of priority under 35 U.S.C. § 119 from U.S. Provisional Patent Application Ser. No. 62/543,338 entitled "DISTRIBUTED ACOUSTIC SENSING INTERROGATOR USING SINGLE-MODE FIBER FOR MULTI-MODE FIBER INTERROGATION," filed on Aug. 9, 2017, the disclosure of which is hereby incorporated by reference in its entirety for all purposes.

TECHNICAL FIELD

The present disclosure relates to distributed sensing logging measurement systems, and more particularly to distributed sensing interrogator using single-mode fiber for multi-mode fiber interrogation.

BACKGROUND

Distributed sensing technology may be suitable for various downhole applications ranging from temperature sensing to passive seismic monitoring. For example, a distributed sensing system may include an interrogation device positioned at a surface proximate to a wellbore and coupled to an optical sensing optical fiber extending from the surface into the wellbore. An optical source of the interrogation device may transmit an optical signal, or an interrogation signal, downhole into the wellbore through the optical sensing optical fiber. Reflections of the optical signal can propagate back toward an optical receiver in the interrogation device and the reflections can be analyzed to determine a condition in the wellbore.

BRIEF DESCRIPTION OF THE DRAWINGS

The following figures are included to illustrate certain aspects of the implementations, and should not be viewed as exclusive implementations. The subject matter disclosed is capable of considerable modifications, alterations, combinations, and equivalents in form and function, as will occur to those skilled in the art and having the benefit of this disclosure.

DETAILED DESCRIPTION

Figure 1:
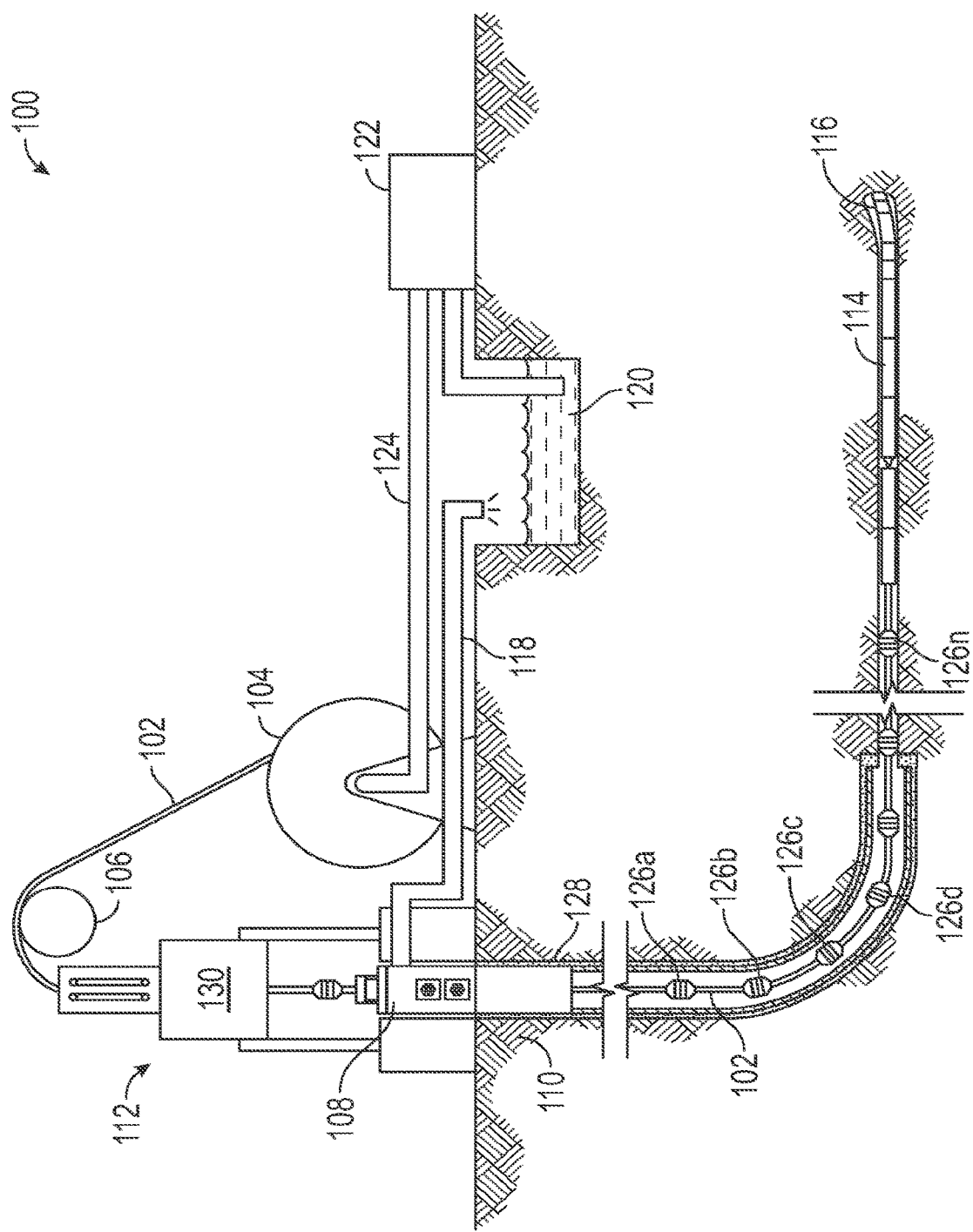
FIG. 1 illustrates an exemplary well monitoring and measurement system that may employ the principles of the present disclosure in accordance with one or more implementations.

Reflections of an optical signal may consist of Rayleigh backscattering, as is used in Distributed Acoustic Sensing, or Raman backscattering, as is used for temperature sensing, or other form of backscattering (e.g., Brillouin). Most interrogation systems are configured to work with single-mode fiber ("SMF"). However, in practice, it can happen that only optical fiber available for interrogation is a multi-mode fiber. It is desirable to be able to connect an interrogator designed for single-mode fiber to a multi-mode fiber ("MMF") and obtain useful distributed measurements from the multi-mode fiber.

In some examples, a single-mode optical fiber can directly couple an interrogation subsystem to a multi-mode sensing optical fiber. The interrogation subsystem can transmit an optical pulse to the single-mode fiber. The optical pulse can propagate through the single-mode fiber and enter the multi-mode sensing optical fiber through a splice or a connector. The optical pulse can propagate through the multi-mode sensing optical fiber using a single mode of the multi-mode fiber, but this propagation condition typically is held for a short propagation distance along the multi-mode fiber. In realistic propagation conditions, the light energy is divided into multiple modes in the multi-mode fiber. Even though light energy is spread over a number of modes, there is only minimal loss of total energy when going from the single-mode to the multi-mode fiber.

Backscatter from the multi-mode fiber initially propagates in the multi-mode fiber back towards the interrogator. When this backscatter light reaches the splice to single-mode, only part of the light traveling towards the interrogator is coupled into the single-mode fiber. This is because the single mode field occupies a smaller area. Numerical aperture mismatch also plays a role. In this regard, a large loss of signal intensity is incurred when connecting a multi-mode fiber to a single mode-fiber.

As used herein, the terms "single-mode fiber" and "SMF" are interchangeable with the term "single-mode optical fiber," and the terms "multi-mode fiber" and "MMF" are interchangeable with the term "multi-mode optical fiber," without departing from the scope of the present disclosure.

An interrogator connected to a single-mode fiber, which is then connected (or spliced) to a multi-mode fiber, receives backscattering from both the single-mode portion of the fiber cable, and from the multi-mode portion of the fiber cable. Because of the attenuation at the splice mentioned above, however, the intensity measured by the interrogator of the multi-mode backscatter signal is attenuated significantly compared to the backscatter that comes from the single-mode fiber portion. This is because the multi-mode fiber backscatter is attenuated at the MMF to SMF splice, whereas the SMF backscatter remains in a SMF propagation path to the detector. In such a system, interrogator light pulse intensity and amplification (optical and/or electronic), when set to provide sufficient detected power for good signal-to-noise-ratio of the multi-mode fiber backscatter results in detector electronics saturation for the single-mode fiber backscatter signal. Therefore, it is not possible to interrogate the SMF portion and the MMF portions simultaneously.

Using a mode scrambler can transmit a single-mode optical signal into multiple modes of the multi-mode fiber. The mode scrambler can distribute the energy of the optical signal among multiple low loss modes. The mode scrambler can generate a multi-mode optical signal based on a single-mode optical signal and provide a lower density multi-mode optical signal as an interrogation signal for a distributed sensing optical fiber. Using the mode scrambler in a distributed sensing system can allow the system to transmit optical signals at a higher power and with a lower energy distribution, which can produce a higher signal-to-noise ratio ("SNR"). In some aspects, a mode scrambler can be a device communicatively coupled to a multi-mode optical fiber. In additional or alternative aspects, the mode scrambler can be constructed by applying micro-bending to the multi-mode optical fiber to cause an optical signal propagating through the multi-mode optical fiber to split into multiple modes. A mode scrambler may not help to reduce the intensity loss of the backscattered light going from the multi-mode fiber to the single-mode fiber.

Previous attempts to use multi-mode fiber for distributed sensing either involved having the MMF in the interrogator, modification or special design of a distributed sensing ("DS") box, or connecting directly an SMF to a MMF or MMF scrambler, which did not compensate for the attenuation of signals described above. This meant that to get a strong enough backscatter signal (or reflective optical signal) from the MMF, the single-mode topical signal from the SMF section would saturate the detector and not be useable.

The present disclosure provides for the use of a DS interrogator designed for SMF to operate with MMF in such a way that 1) the apparatus can be external to the SMF DS interrogator so that the DS interrogator does not need to be modified; 2) effective losses observed at the interface between MMF and SMF are minimized so that the MMF backscatter signal appears as the same strength as the SMF signal; 3) the SMF section before the apparatus can be interrogated without penalty (e.g., no saturation of signal), which is useful because it allows the use of piezoelectric ceramic material (e.g., PZT) fiber stretchers within the SMF DS interrogator in a standard manner, without requiring the same to be located in the MMF section thus no need for MMF stretchers; and 4) the apparatus is compatible with multi-wavelength DS systems as well as homodyne and heterodyne interrogation schemes. In other words, the subject technology provides for a convenient and efficient way of using a SMF DS interrogator with MMF.

The subject technology provides several advantages over traditional distributed sensing systems. For example, the subject system allows the use of SMF with MMF efficiently by amplifying and filtering a single-mode optical signal for MMF interrogation with minimal loss in signal integrity in the backscatter light. Other advantages include lower cost of ownership of the DS system such that there is no need for separate MMF and SMF DS system. The subject system also provides better SNR for use with MMF compared to traditional distributed sensing systems.

The subject technology relates to distributed sensing interrogation using SMF for MMF interrogation. The subject technology includes deploying a distributed sensing tool into a wellbore penetrating a subterranean formation, and logging the wellbore using the distributed sensing tool. The distributed sensing tool includes an optical amplifier and an optical filter coupled to a single-mode optical fiber and to a multi-mode optical fiber. The optical amplifier is coupled to a single-mode circulator for amplifying a single-mode optical signal, and the optical filter is coupled to the optical amplifier for filtering the amplified single-mode optical signal. The single-mode circulator is coupleable to an interrogator for routing the single-mode optical signal to the multi-mode optical fiber and routing a reflective optical signal from the multi-mode optical fiber to the interrogator. A mode scrambler is coupleable to the multi-mode optical fiber for outputting a multi-mode optical signal generated from the filtered single-mode optical signal. A typical application of such a system is a Distributed Acoustic Sensing (DAS) system operating using Rayleigh backscatter signaling. Such a system is typically built using SMF and with the device disclosed herein can be used to interrogate MMF.

FIG. 1 illustrates an exemplary well monitoring and measurement system 100 that may employ the principles of the present disclosure in accordance with one or more implementations. It may be noted that the well monitoring and measurement system 100 can be used in a land-based operation as well as in any sea-based or sub-sea application including a floating platform or sub-surface wellhead installation, as generally known in the art. The well monitoring and measurement system 100 can also include additional or different features that are not shown in FIG. 1. For example, the well monitoring and measurement system 100 can include additional wireline logging system components, production system components, completion system components, or other components. In the present disclosure, distributed sensing systems may be permanently installed and connected to a sensing fiber with the objective of monitoring production and flow rates over time.

Horizontal drilling techniques for forming a wellbore often include vertically drilling from a surface location to a desired subterranean depth, from which point, drilling is curved or at a sub-terrain plane approximately horizontal to the surface to connect the wellbore to multiple hydrocarbon deposits.

As illustrated, the well monitoring and measurement system 100 may include a service rig 112 that is positioned on the earth's surface 136 and extends over and around a wellbore 128 that penetrates a subterranean formation 110. The service rig 103 may be a drilling rig, a completion rig, a workover rig, a production rig, or the like. In some embodiments, the service rig 103 may be omitted and replaced with a standard surface wellhead completion or installation, without departing from the scope of the disclosure. Moreover, while the well monitoring and measurement system 100 is depicted as a land-based operation, it will be appreciated that the principles of the present disclosure could equally be applied in any sea-based or sub-sea application where the service rig 103 may be a floating platform, a semi-submersible platform, or a sub-surface wellhead installation as generally known in the art.

The wellbore 128 may be drilled into the subterranean formation 110 using any suitable drilling technique and may extend in a substantially vertical direction away from the earth's surface 136 over a vertical wellbore portion. At some point in the wellbore 128, the vertical wellbore portion may deviate from vertical relative to the earth's surface 136 and transition into a substantially horizontal portion. In other embodiments, however, the casing string may be omitted from all or a portion of the wellbore 128 and the principles of the present disclosure may equally apply to an "openhole" environment.

As illustrated in FIG. 1, the well monitoring and measurement system 100 includes a tubing system 102, which is placed on a reel 104. The tubing system 102 passes over a guide arch 106, commonly referred to in the oil and gas industry as a "gooseneck," and is directed downhole through an injector head 108 into a subterranean formation 110. The guide arch 106 may include a rigid structure that exhibits a known radius. As the tubing system 102 is conveyed through the guide arch 106, the tubing system 102 may be plastically deformed and otherwise re-shaped and re-directed for receipt by the injector head 108 located therebelow.

During a tubing operation, the tubing system 102 is fed off the reel 104 over the injector head 108 into a wellbore 128. In some implementations, for example, the injector head 108 may include a plurality of internal gripping elements or wheels (not shown) configured to engage the outer surface of the tubing system 102 to either pull the tubing system 102 from the reel 108, or retract the tubing system 102 from the wellbore 128 to be wound again on the reel 104. In some implementations, however, the injector head 108 may be omitted and the weight of the tubing system 102 may instead be used for deployment and the reel 104 may be motorized to retract the tubing system 102.

Fluid may be delivered to a bottom hole assembly 114 and a downhole tool 116 through the tubing system 102. The fluid may then be returned to the surface 136 through the annulus between the wellbore wall (or casing if the wellbore 128 is cased) and the tubing system 102. The returned fluid may be directed to a returned fluid pipe 118 and delivered to a mud pit 120. A recirculation pump 122 may then recirculate the fluid through the pipe 124 to the tubing system 102.

The tubing system 102 may be, but is not limited to, coiled tubing, intelligent coiled tubing, hybrid coiled tubing, or the like. The term "coiled tubing" normally connotes a relatively small diameter continuous tubing string that can be transported to a well site on a drum or in a reel (e.g., 104). As oil and gas exploration technology continues to improve the demand for better wellbore information grows and there has been more interest in using coiled tubing to deploy more instrumentation into the wellbore 128, particularly pressure and temperature sensors.

In some implementations, the tubing system 102 may comprise a conduit or umbilical used to convey fluids or power to a subsea location (not shown), such as a wellhead, a submerged platform, or a subsea pipeline. The tubing system 102 may be made of a variety of deformable materials including, but not limited to, a steel alloy, stainless steel, titanium, other suitable metal-based materials, thermoplastics, composite materials (e.g., carbon fiber-based materials), and any combination thereof. The tubing system 102 may exhibit a diameter of about 3.5 inches, but may alternatively exhibit a diameter that is greater or less than 3.5 inches, without departing from the scope of the disclosure.

As illustrated, the well monitoring and measurement system 100 may include a plurality of distributed sensors and devices (e.g., 126a-n), each communicably coupled to a data acquisition system 130 configured to receive and process signals deriving from each sensor and/or device. The data acquisition system 130 may be a computer system, for example, that includes a memory, a processor, and computer readable instructions that, when executed by the processor, process the sensor signals. As illustrated, the data acquisition system 130 is communicably coupled to the tubing system 102 and housed in a feeding guide component of the service rig 112. The data acquisition system 130 may be communicably coupled to the tubing system 102 and located in a different section of the service rig 112 from that shown in FIG. 1 without departing from the scope of the present disclosure.

A typical fiber telemetry system inside coiled tubing can consist of at least three fiber optic pressure transducers, one at the heel, one at the toe and one in the middle of the horizontal portion, along with additional fiber for DTS (Distributed Temperature Sensing) and/or DAS (Distributed Acoustic Sensing) telemetry. Each sensor may have single or multiple fibers. Although the number of fibers can vary, the examples given in this disclosure will demonstrate the deployment of optical fibers for DTS and/or DAS telemetry to cover wireline, tubing, casing, and coiled tubing (including intelligent, hybrid systems).

The distributed sensors, having e.g., optical fiber, can be pulled and/or pumped into coiled tubing (see e.g., FIG. 2D) for retrievability. The tubing system 102 can also include various electrical sensors, including point thermocouples for temperature sensing as well as DTS system calibration. The DTS and/or DAS fibers can be deployed on a wireline (see FIG. 2A) for retrievability, or pumped into a conduit after installation. The fiber for the DTS can be pumped into a double-ended conduit for some coiled tubing deployments. The location of the sensors can be carefully measured before they are pulled into the coiled tubing. The exact location can then be identified using e.g. x-ray systems and/or ultrasonic systems and/or DAS systems by tapping on the coiled tubing and/or by DTS systems and apply a thermal event or other similar methods where distance can be verified and compared with distances measured before a sensing string is pulled into the coiled tubing. Penetrations can then be drilled though the coiled tubing at suitable locations, and suitable seals can be applied to/activated on the assembly. All of the installation of the sensor systems into the tubing is done in the coiled tubing before the tubing is deployed downhole.

In some implementations, the distributed sensors may comprise distributed acoustic sensors, which may also use optical fibers and permit a distributed measurement of local acoustics at any given point along the fiber. Additionally or alternatively, in an example (not explicitly illustrated), the distributed sensors may be permanently attached to or embedded within the one or more strings of casing lining the wellbore 128 (see FIG. 2C), to the one or more strings of tubing positioned downhole within the casing (see FIG. 2B), and/or the wall of the wellbore 128 at an axially spaced pre-determined distance. The optical fiber may include single-mode fiber, multi-mode fiber, or a combination thereof. The distributed acoustic sensors may be configured to operate as DAS subsystem and/or a DTS subsystem. The distributed sensing system may work using Rayleigh backscattering (e.g, DAS), or Brillouin (e.g., Distributed Temperature Sensing, or Distributed Strain Sensing), or Raman (Distributed Temperature Sensing).

FIGS. 2A-2D illustrate examples of distributed sensing deployment options that can employ the principles of the present disclosure in accordance with one or more implementations. Wellbores for use in oil and gas exploration and production are often drilled in stages where a first stage is drilled and lined with a casing (e.g., surface casing 201), then a second, smaller diameter stage is drilled and lined with a casing (e.g., production casing 202), and so on. In some implementations, the wellbore 128 may be completed by cementing a casing string within the wellbore 128 along all or a portion thereof. Once drilling of the wellbore (e.g., 128) is finished, the wellbore completion operations are then undertaken. Completion operations generally refer to the events necessary to bring a wellbore into production once drilling operations have concluded.

In FIG. 2A, a wireline assembly 200 includes a tubing 204 deployed into a wellbore (e.g., 128) and routed through the production casing 202. A wireline cable (e.g., cable 203) housing optical fibers may be routed through the tubing 204, and later retrievable from the wellbore 128. In some aspects, the optical fibers are coupled to a wireline cable (e.g., cable 203). The optical fibers can be coupled to the wireline such that the optical fibers are removable with the wireline. The cable 203 can include multiple optical fibers. For example, the optical fibers can include one or more single-mode optical fibers and one or more multi-mode optical fibers. Each of the optical fibers may include one or more optical sensors along the optical fibers. The optical sensors may be deployed in the wellbore 128 and used to sense and transmit measurements of downhole conditions in the wellbore 128 to the earth's surface (e.g., 136). A bottom hole gauge carrier 205 is coupled to a distal end of the cable 203 for taking measurements at the toe end of the lateral wellbore. In some aspects, the bottom hole gauge carrier 205 includes a pressure/temperature gauge for measuring pressure and/or temperature.

In some implementations, Single-Mode Fiber (SMF) may be used for both DAS/DTS, or Multi-Mode Fiber (MMF) may be used for both DAS/DTS depending on implementation. In some implementations, double-clad-dual-core fiber may be employed while using e.g., SMF for DAS on the inner core and MMF DTS on the outer core without departing from the scope of the present disclosure.

In FIG. 2B, a tubing assembly 210 includes the tubing 204 deployed into the wellbore (e.g., 128) and routed through the production casing 202. The cable 203 may be routed through the tubing 204 and permanently installed along an outer surface of the tubing 204. The optical fibers housed in the cable 203 may be retained against the outer surface of the tubing 204 at intervals (e.g., every other joint) by coupling bands (e.g., cross-coupling protectors 211) that extend around the tubing 204. In some aspects, a tubing tail 212 can be extended below a bottom perforation.

In FIG. 2C, a casing assembly 220 includes a tubing 204 deployed into the wellbore (e.g., 114) and routed through the production casing 202. The cable 203 may be routed through the surface casing 201 and permanently installed along an outer surface of the production casing 202. The optical fibers housed in the cable 203 may be retained against the outer surface of the production casing 202 at intervals (e.g., every other joint) by coupling bands (e.g., cross-coupling protectors 211) that extend around the production casing 202.

In FIG. 2D, a coiled tubing assembly 230 includes a tubing 204, such as a coiled tubing system, deployed into a wellbore (e.g., 128) and routed through the production casing 202. A cable 203 housing optical fibers may be coupled to an outer surface of the tubing 204. In some aspects, the optical fibers are coupled to the cable 203. The optical fibers can be non-permanently coupled to the cable 203 such that the optical fibers are removable with the cable 203. The cable 203 can include multiple optical fibers. For example, the optical fibers can include one or more single-mode optical fibers and one or more multi-mode optical fibers. Each of the optical fibers may include one or more optical sensors along the optical fibers. The optical sensors may be deployed in the wellbore 128 and used to sense and transmit measurements of downhole conditions in the wellbore 128 to the earth's surface (e.g., 136). A bottom hole gauge carrier 205 is routed through the tubing 204 beyond a distal end of the cable 203 to a bottom hole assembly module (e.g., 114) for taking measurements at the toe end of the lateral wellbore, and later retrievable from the wellbore 128 through the tubing 204. In some aspects, the bottom hole gauge carrier 205 includes a pressure/temperature gauge for measuring pressure and/or temperature.

The cable 203 may be configured for optical fiber sensing to obtain point or distributed optical fiber measurements. As used herein, "distributed optical fiber sensing" refers to the ability to obtain well parameter measurements along the entire length of an optical fiber, but also refers to the ability to obtain point measurements from point reflectors (e.g., Fiber Bragg Gratings, etc.) included at predetermined locations along the optical fiber(s). The optical fibers in the cable 203 may be used as distributed acoustic sensors and/or distributed temperature sensors. In an example, one or more optical fibers may be used for one or more of DAS or DTS.

A number of distributed sensing methodologies may be used to determine the well parameters of interest, without departing from the scope of the present disclosure. When electromagnetic radiation is transmitted through an optical fiber, a portion of the electromagnetic radiation will be backscattered in the optical fiber by impurities of the optical fiber, areas of different refractive index in the fiber generated in the process of fabricating the fiber, interactions with the surfaces of the optical fiber, and/or connections between the fiber and other optical fibers or components. Some of the backscattered electromagnetic radiation is treated as unwanted noise and steps may be taken to reduce such backscattering.

Figure 2:
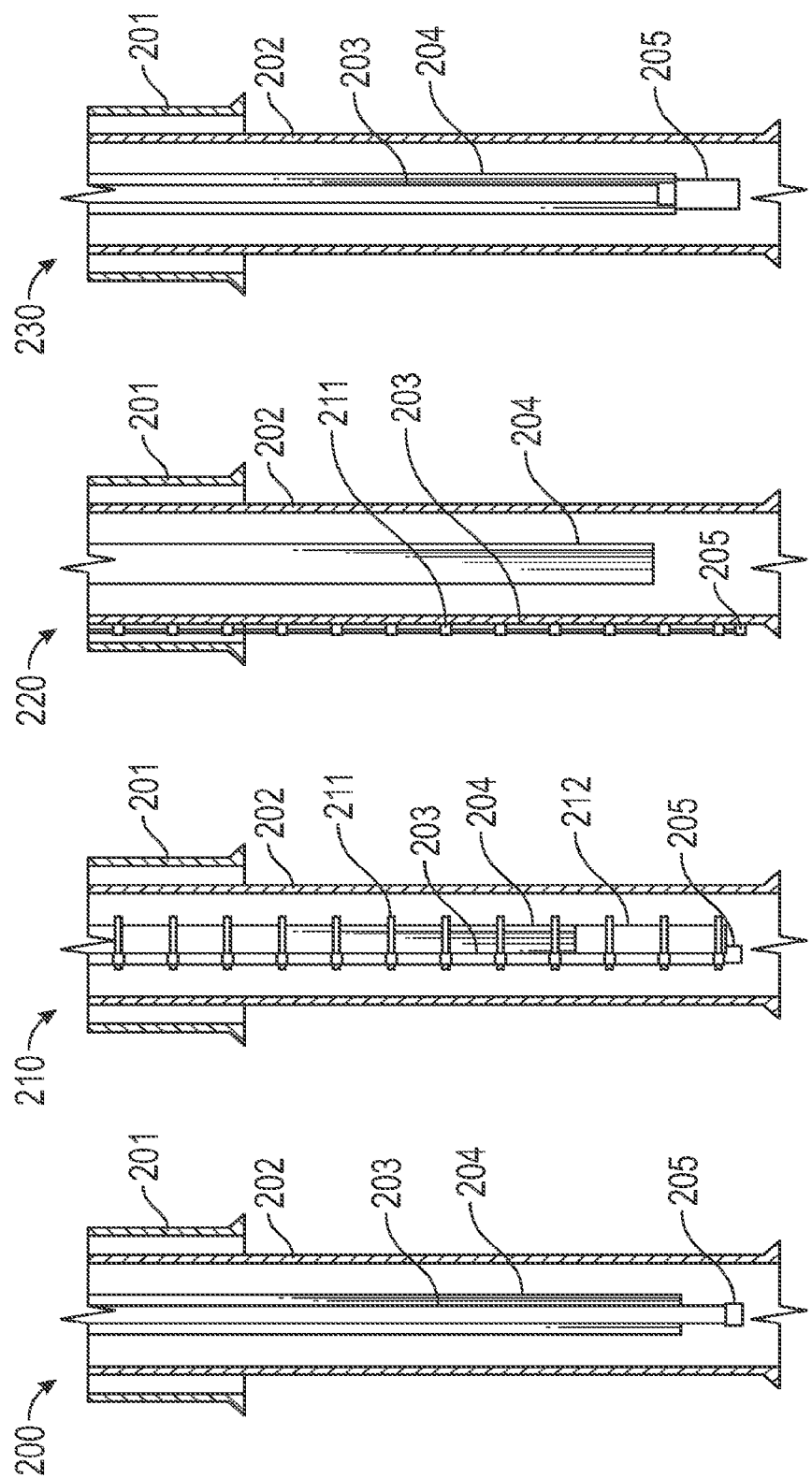
FIGS. 2A-2D illustrate examples of distributed sensing deployment options that can employ the principles of the present disclosure in accordance with one or more implementations.
Figure 3:
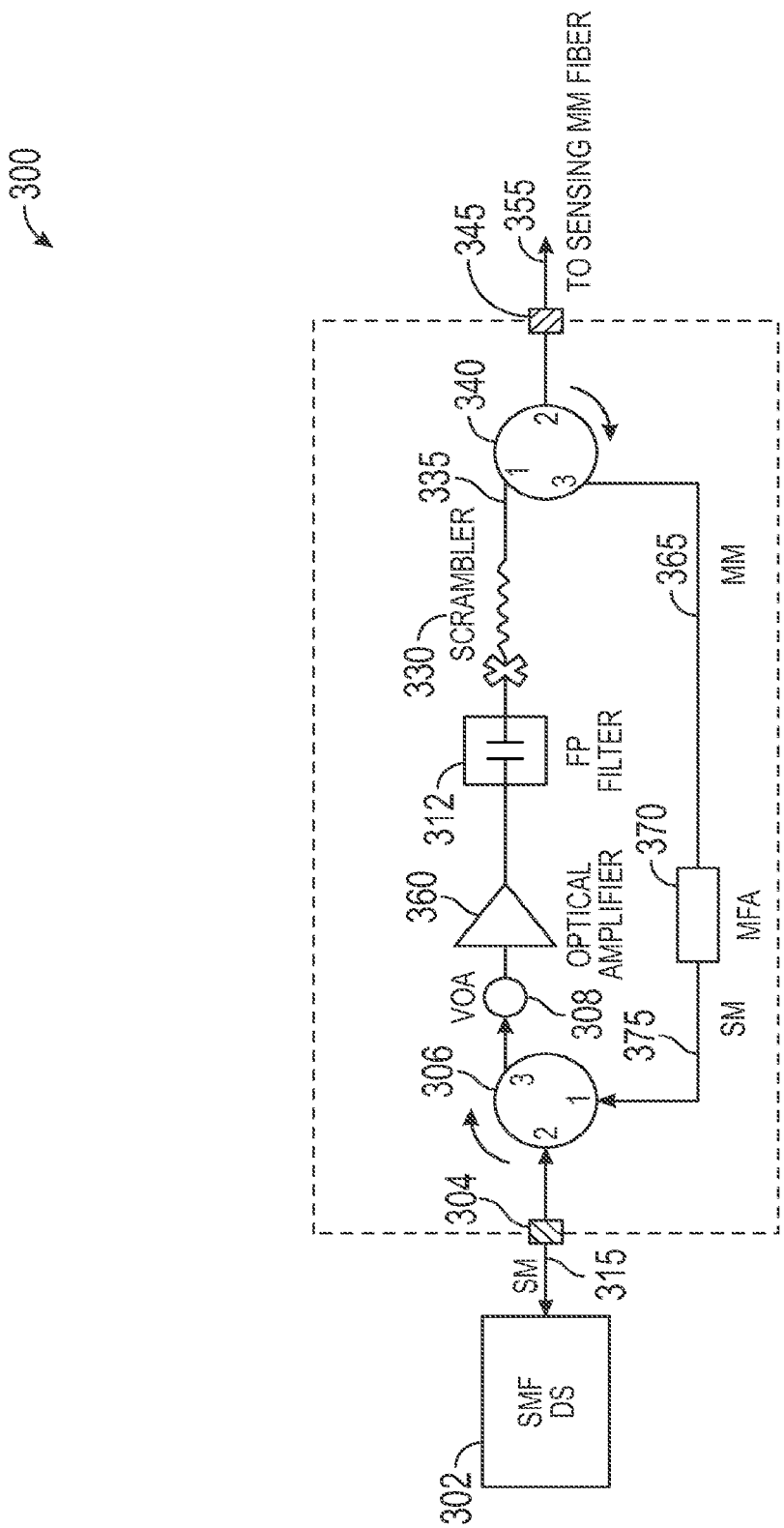
FIG. 3 illustrates an example of a distributed sensor interrogator using single-mode fiber for multi-mode fiber interrogation.

FIG. 3 is a schematic diagram of an example of a distributed sensing system 300 according to one aspect of the present disclosure. The distributed sensing system 300 includes a distributed sensing (DS) interrogator 302. In some aspects, the DS interrogator 302 of FIG. 2 represents one configuration of the computing subsystem 118 and the cable 203 of FIGS. 2A-2D, but other configurations are possible. For example, the components of the distributed sensing system 300 may be arranged in a different order or configuration without departing from the scope of the present disclosure. Similarly, one or more components may be added to or subtracted from the configuration of the distributed sensing system 300 shown in FIG. 3 without departing from the scope of the present disclosure.

The DS interrogator 302 is connected to a SMF lead, which is connected to the "SMF DS" (single-mode fiber distributed sensing) interrogator side of the assembly using a high power fiber connector 304. Laser pulses launched from the DS interrogator 302 are fed to a bi-directional port of a SMF circulator (port 2), which is connected at port 3 to a SMF variable optical attenuator (VOA) 308 in front of an optical amplifier 360, which amplifies the light and feeds it to an optical filter 312. The optical filter 312 removes the amplified spontaneous emission (ASE) noise from the optical amplifier 360. The output of the optical filter 312 is connected to a mode scrambler 330, the output of which is connected to port 1 of a multi-mode circulator 340, which guides the light to port 2 (a bi-directional port) to a distributed sensing optical fiber 355. The backscatter from the distributed sensing optical fiber 355 is fed via the multi-mode circulator 312 to port 3 of the multi-mode circulator 340, which is connected to a SMF via a mode field adapter (MFA) 370 leading to port 1 of the single-mode circulator 306, which guides the light to port 2 of the single-mode circulator 306 back towards the DS interrogator 302. In some aspects, the mode field adapter 370 is replaced with a simple multi-mode to single-mode splice.

The distributed sensing interrogator 302 may be positioned at a surface of a wellbore and the DS interrogator 302 may include an optical source (not shown). The optical source may include a laser and a pulse generator. The laser can emit optical signals that can be manipulated by the pulse generator. In some aspects, the pulse generator may include one or more amplifiers, oscillators, or other suitable components to manipulate the optical signals emitted by the laser to generate pulses of optical signals at a controlled time duration. The pulses of the optical signals from the pulse generator may be transmitted to a single-mode optical fiber 315. In some aspects, the single-mode optical fiber 315 may route optical signals having a wavelength in the range of 1300 nanometers to 1600 nanometers. In additional or alternative aspects, the single-mode optical fiber 315 may include a core diameter between 8 and 10 microns.

The single-mode circulator 306 can be a three-port single-mode circulator 306 including ports 1 to 3. The single-mode circulator 306 may include one or more isolation components to isolate the input of the optical signals at each of the ports 1 to 3. Port 1 is communicatively coupled to the output (or Port 3) of a multi-mode circulator 340 by a second multi-mode optical fiber 335 via a mode field adapter 370 for receiving the reflective optical signal from the multi-mode circulator 340.

The single-mode circulator 306 may route the reflective optical signal from port 1 to port 2. Port 2 is communicatively coupled to the DS interrogator 302. Port 2 may receive the single-mode optical signal from the distributed sensing interrogator 302. Port 2 may route the single-mode optical signal to port 3. The unilateral nature of the single-mode circulator 306 can prevent the input single-mode optical signal from traversing toward the multi-mode circulator 340.

The optical amplifier 360 can include an erbium-doped fiber amplifier ("EDFA") that may amplify a received optical signal without first converting the optical signal to an electrical signal. For example, an EDFA may include a core of a silica fiber that is doped with erbium ions to cause the wavelength of a received optical signal to experience a gain to amplify the intensity of an outputted optical signal. Although only one optical amplifier 360 is shown in FIG. 3, the optical amplifier 360 may represent multiple amplifiers without departing from the scope of the present disclosure. In some implementations, the optical filter 312 is a Fabry-Pérot (FP) filter. In some aspects, the optical filter 312 represents a notch filter that attenuates signals within a specified narrow frequency range.

The purpose of the VOA 308 is to attenuate light at the input of the optical amplifier 360 and is particularly useful in the case of a multi-wavelength DAS. Because there can be a time delay between pulses at different wavelength, if the input intensity is too high, light from the first wavelength pulse to arrive would reduce the gain of the second and subsequent wavelength pulses. In some cases, the VOA 308 is not needed since the output can be adjusted by the current fed to the optical amplifier 360 pump lasers.

The pulses of the optical signal can propagate through the single-mode optical fiber 315 to arrive at a mode scrambler 330. The mode scrambler 330 may include a device that includes a mode mixer for providing a modal distribution of optical signals. For example, the mode scrambler 330 may receive a single-mode optical signal from the optical filter and generate a multi-mode optical signal that uses multiple modes, or patterns, of the single-mode optical signal. Each mode of the multi-mode optical signal may propagate an optical path in a different direction. The multi-mode optical signal may be output by the mode scrambler 330 through a multi-mode optical fiber 335 to a multi-mode circulator 340.

The purpose of the mode scrambler 330 is to distribute the light into all the modes supported by the MMF evenly, which is desirable to minimize non-linear effects in the optical fiber. The MMF in the assembly output is connected to the distributed sensing optical fiber 355 using an angled fiber connector, but does not need to be of a high-power type, since the mode field area of the MMF is much larger than the SMF and, therefore, there is less risk of damage to the fiber connection compared to high power going through SMF connectors.

The multi-mode circulator 340 can be a three-port multi-mode circulator 340 including ports 1 to 3. The multi-mode circulator 340 may include one or more isolation components to isolate the input of the optical signals at each of the ports 1 to 3. Port 1 is communicatively coupled to the output of the mode scrambler 330 by the second multi-mode optical fiber 335 for receiving the multi-mode optical signal from the mode scrambler 330. The multi-mode circulator 340 may also be optically transparent. For example, the multi-mode circulator 340 may operate in a passband wavelength range to allow optical signals to be routed through the multi-mode circulator 340 without being scattered, in an optically transparent manner.

The multi-mode circulator 340 may route the multi-mode optical signal from port 1 to port 2. Port 2 is communicatively coupled to a distributed sensing optical fiber 355, which can be positioned in the wellbore 114. The multi-mode optical signals can be output from port 2 to the distributed sensing optical fiber 355 via a multi-mode fiber connector 345 to interrogate downhole optical sensors coupled to the distributed sensing optical fiber 355. Port 2 may receive reflective multi-mode optical signals. The reflective multi-mode optical signals may correspond to reflections of the multi-mode optical signals transmitted through the distributed sensing optical fiber 355. For example, the multi-mode optical signals may be routed by the distributed sensing optical fiber 355 to the downhole sensors and reflected back through the distributed sensing optical fiber 355 to port 2. Port 2 may route the reflected multi-mode optical signals to port 3. The unidirectional nature of the multi-mode circulator 340 can prevent the reflected light from the downhole sensors from reflecting back toward the mode scrambler 330. Port 3 of the multi-mode circulator 340 can be coupled to a multi-mode optical fiber 365. The multi-mode optical fiber 365 can be coupled to a single-mode optical fiber 375 by a mode field adapter 370.

The distributed sensing optical fiber 355 can include one or more multi-mode optical fibers that can propagate optical signals in more than one mode. In additional or alternative aspects, the core diameter of a multi-mode optical fiber (e.g., 50 microns to 100 microns) may be larger than the core diameter of a single-mode optical fiber. A larger core diameter can allow a multi-mode optical fiber to support multiple propagation modes.

Figure 4:
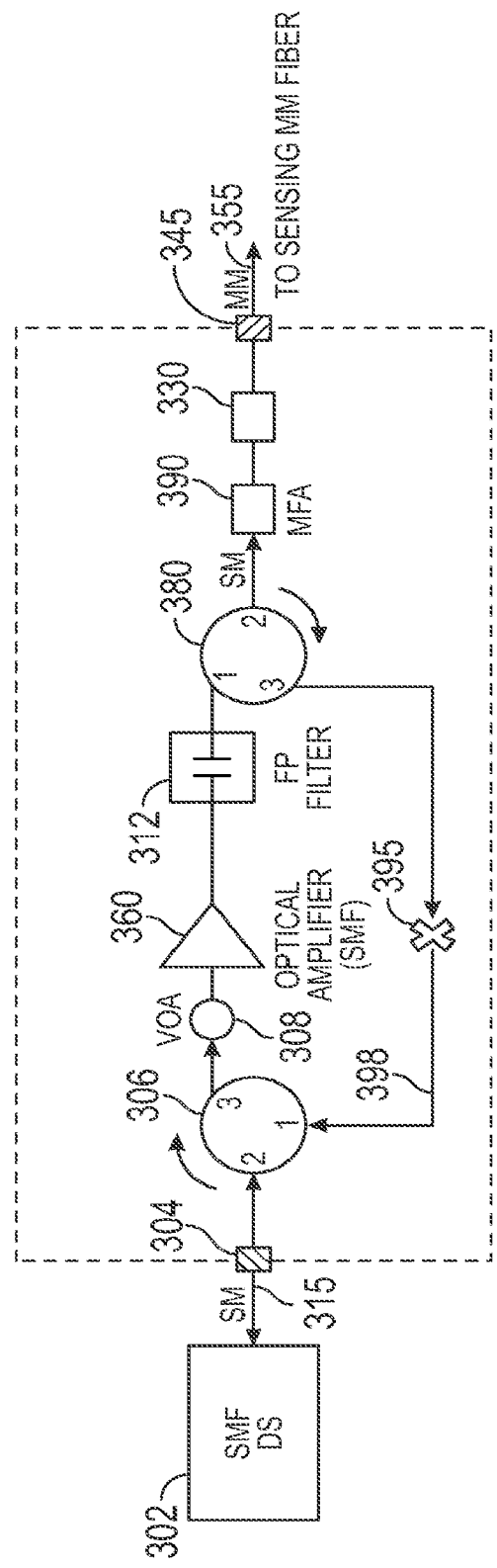
FIG. 4 illustrates another example of a distributed sensor interrogator using single-mode fiber for multi-mode fiber interrogation.

Another example of a distributed sensing system 400 to accomplish the same task is presented in FIG. 4. The DS interrogator 302 is connected to a SMF lead, which is connected to the "DAS" side of the assembly using a high power fiber connector 304. Laser pulses launched from the DS interrogator 302 are fed to a bi-directional port of the single-mode circulator 340 at port 2, which is connected at port 3 to a variable optical attenuator (VOA) 308 in front of an optical amplifier 360, which amplifies the light and feeds it to the optical filter 312. The output of the optical filter 312 is then connected to port 1 of a second single-mode circulator 380, which guides the light to port 2 (a bi-directional port) of the second single-mode circulator 380. The single-mode optical signal from the output of the second single-mode circulator 380 at port 2 is fed to a mode field adapter (MFA) 390. In some aspects, the MFA 390 is a single-mode to multi-mode splice. In some implementations, the MFA 390 includes a mode scrambler. The output of the MFA 390 is connected to the distributed sensing optical fiber 355 via the multi-mode fiber connector 345. The backscatter from the distributed sensing optical fiber 355 is fed back via the MFA 390 to port 2 of the second single-mode circulator 380 to port 3 of the second single-mode circulator 380, which is connected to a single-mode optical fiber 398 via a single-mode splice 395 leading to port 1 of the single-mode circulator 306, which guides the light to port 2 of the single-mode circulator 306 back towards the DS interrogator 302.

In FIG. 4, both circulators (e.g., 306, 380) use single-mode fiber and only one connection is made to a MMF internal to the assembly (e.g., that between the bi-directional port of the second single-mode circulator 380 and the MFA 390). This approach has the advantage of using only SMF circulators, which are more readily available and are less expensive compared to MMF circulators. However, this is at the penalty of having light traverse a mode scrambler twice (one in the forward direction, and once in the reverse direction for the backscatter). This means higher attenuation compared to a single-pass, where a mode scrambler may typically provide about 2 dB to 4 dB of attenuation each direction. In some implementations, the MFA 390 is replaced with a simple fusion splice.

Figure 5:
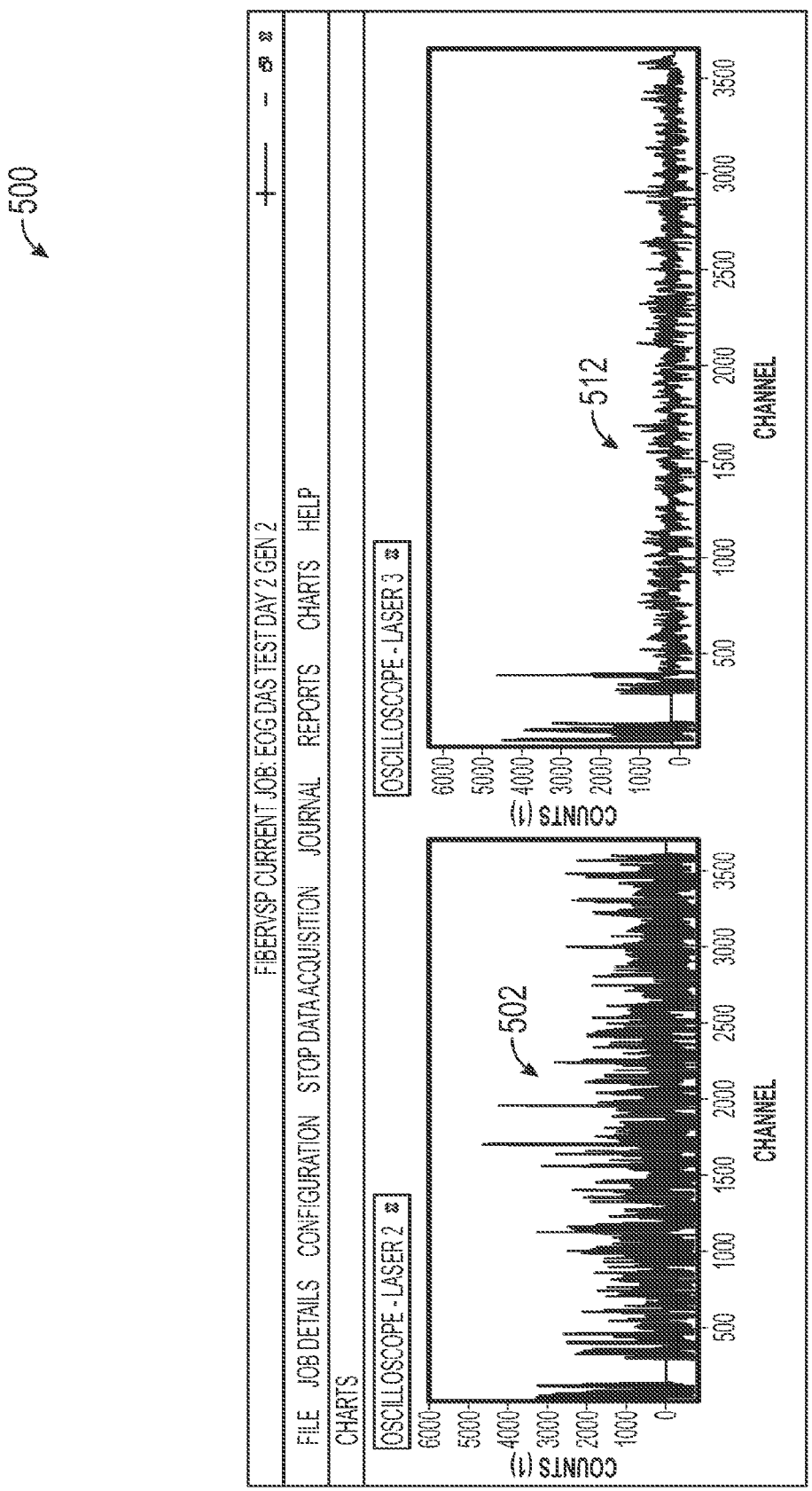
FIG. 5 illustrates an example of a backscatter waveform based on single-mode fiber and multi-mode fiber.

FIG. 5 illustrates an example of a backscatter waveform 500 using single-mode fiber and multi-mode fiber. The backscatter signal can be measured with the DS interrogator 302. The waveform 502 is representative of adequate gain in the optical amplifier 360 to make the signal from the MMF portion (e.g., reflective optical signal) match that of the SMF portion (single-mode optical signal). The waveform 512 is indicative of insufficient gain such that the signal strength of the reflective optical signal would not match that of the single-mode optical signal. Both the optical amplifier 360 pump current and the input VOA 308 can be adjusted to modify the gain of the single-mode optical signal.

Various examples of aspects of the disclosure are described below. These are provided as examples, and do not limit the subject technology.

A system includes a single-mode circulator coupleable to a distributed sensing interrogator for routing a single-mode optical signal from the distributed sensing interrogator through a single-mode optical fiber to a multi-mode optical fiber positionable along a region to be sensed and communicatively coupleable to an optical receiver of the distributed sensing interrogator for routing a reflective optical signal received from the multi-mode optical fiber to the optical receiver; and an optical amplifier coupled to the single-mode circulator for amplifying the single-mode optical signal.

A method is provided that includes routing, by a single-mode circulator communicatively coupled to a distributed sensing interrogator, a single-mode optical signal through a single-mode optical fiber positioned in a wellbore; amplifying, by an optical amplifier coupled to the single-mode circulator, the single-mode optical signal by a predetermined gain; filtering, by an optical filter coupled to the optical amplifier, the amplified single-mode optical signal to remove one or more noise components from the amplified single-mode optical signal; coupling, by a mode scrambler into multiple modes of a multi-mode fiber, the amplified single-mode optical signal from the optical amplifier; receiving, by a multi-mode circulator coupled to the mode scrambler, a reflective optical signal on a multi-mode optical fiber positioned in the wellbore in response to routing the multi-mode optical signal; and routing, by the multi-mode circulator, the reflective optical signal to the single-mode circulator.

A system includes a distributed sensing interrogator; a distributed sensing mode converter; and a distributed sensing subsystem positionable along a region to be sensed and that includes a multi-mode optical fiber as a communication medium for an interrogation optical signal and a reflective optical signal, wherein the distributed sensing mode converter comprises: a first single-mode circulator coupleable to the distributed sensing interrogator for routing a single-mode optical signal from the distributed sensing interrogator through a single-mode optical fiber to the distributed sensing subsystem and communicatively coupleable to an optical receiver of the distributed sensing interrogator for routing a reflective optical signal received from the distributed sensing subsystem to the optical receiver; an optical amplifier coupled to the first single-mode circulator for amplifying the single-mode optical signal; an optical filter coupled to the optical amplifier for filtering one or more noise components from the amplified single-mode optical signal; and a second single-mode circulator coupled to the optical filter for routing the filtered single-mode optical signal to the mode scrambler and coupled to the first single-mode circulator for routing a reflective optical signal received from the mode scrambler to the first single-mode circulator via the single-mode optical fiber.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

Therefore, the subject technology is well adapted to attain the ends and advantages mentioned as well as those that are inherent therein. The particular embodiments disclosed above are illustrative only, as the subject technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the subject technology. The subject technology illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A system, comprising:
a single-mode circulator coupleable to a distributed sensing interrogator for routing a single-mode optical signal from the distributed sensing interrogator through a single-mode optical fiber to a multi-mode optical fiber positionable along a region to be sensed and communicatively coupleable to an optical receiver of the distributed sensing interrogator for routing a reflective optical signal received from the multi-mode optical fiber to the optical receiver; and
an optical amplifier coupled to the single-mode circulator for amplifying the single-mode optical signal, wherein the single-mode circulator comprises:
a first port coupled to an optical fiber for receiving a reflective optical signal from the multi-mode optical fiber;
a second port communicatively coupleable to the distributed sensing interrogator for receiving the single-mode optical signal from the distributed sensing interrogator; and a third port coupled to the optical amplifier for routing the single-mode optical signal to the optical amplifier.

2. The system of claim 1, further comprising:
an optical filter coupled to an output of the optical amplifier for filtering one or more noise components from the amplified single-mode optical signal.

3. The system of claim 1, further comprising a variable optical attenuator coupled to the single-mode circulator for reducing a power level of the single-mode optical signal.

4. The system of claim 3, wherein the optical amplifier is coupled directly to an output of the variable optical attenuator for amplifying an attenuated single-mode optical signal from the variable optical attenuator.

5. The system of claim 1, wherein the first port of the single-mode circulator is coupled to receive light from a multimode optical fiber via a mode field adapter.

6. The system of claim 1, further comprising:
a second single-mode circulator having a first port coupled to an output of the optical amplifier, a second port connected to the multi-mode optical fiber, and a third port for routing backscatter signaling from the second single-mode circulator to the first port of the single-mode circulator.

7. The system of claim 1, further comprising:
a mode scrambler coupleable to the multi-mode optical fiber for coupling the amplified single-mode optical signal into a plurality of modes of the multi-mode optical fiber.

8. The system of claim 7, further comprising:
a second single-mode circulator having a first port coupled to an output of the optical amplifier, a second port connected to the mode scrambler that is connected to the multi-mode optical fiber, and a third port for routing backscatter signaling from the second single-mode circulator to a first port of the single-mode circulator.

9. The system of claim 7, further comprising:
a multi-mode circulator coupleable to an output of the optical amplifier for routing the amplified single-mode optical signal from the optical amplifier to the multi-mode optical fiber and communicatively coupleable to a first port of the single-mode circulator for routing the reflective optical signal received from the multi-mode optical fiber to the first port of the single-mode circulator.

10. The system claim 9, wherein the multi-mode circulator comprises:
a first port coupled to the mode scrambler for receiving the multi-mode optical signal; a second port communicatively coupleable to the multi-mode optical fiber for routing the multi-mode optical signal to the multi-mode optical fiber and for receiving the reflective optical signal; and
a third port coupled to an optical fiber for routing the reflective optical signal to a first port of the single-mode circulator.

11. The system of claim 1, wherein the single-mode optical signal and reflective optical signal have a same signal intensity.

12. The system of claim 1, wherein the optical amplifier amplifies the single-mode optical signal by a predetermined gain based on a signal intensity of the reflective optical signal.

13. A method, comprising:
routing, by a single-mode circulator communicatively coupled to a distributed sensing interrogator, a single-mode optical signal through a single-mode optical fiber positioned in a wellbore;
amplifying, by an optical amplifier coupled to the single-mode circulator, the single-mode optical signal by a predetermined gain;
filtering, by an optical filter coupled to the optical amplifier, the amplified single-mode optical signal to remove one or more noise components from the amplified single-mode optical signal;
coupling, by a mode scrambler into multiple modes of a multi-mode fiber, the amplified single-mode optical signal from the optical amplifier;
receiving, by a multi-mode circulator coupled to the mode scrambler, a reflective optical signal on a multi-mode optical fiber positioned in the wellbore in response to routing the multi-mode optical signal; and
routing, by ti-mode circulator, the reflective optical signal to the single-mode circulator.

14. The method of claim 13, further comprising:
modifying, by a variable optical attenuator positioned between the single-mode circulator and the optical amplifier, the single-mode optical signal from the single-mode circulator.

15. A system comprising:
a distributed sensing interrogator;
a distributed sensing mode converter; and
a distributed sensing subsystem positionable along a region to be sensed and that includes a multi-mode optical fiber as a communication medium for an interrogation optical signal and a reflective optical signal,
wherein the distributed sensing mode converter comprises:
a first single-mode circulator coupleable to the distributed sensing interrogator for routing a single-mode optical signal from the distributed sensing interrogator through a single-mode optical fiber to the distributed sensing subsystem and communicatively coupleable to an optical receiver of the distributed sensing interrogator for routing a reflective optical signal received from the distributed sensing subsystem to the optical receiver;
an optical amplifier coupled to the first single-mode circulator for amplifying the single-mode optical signal;
an optical filter coupled to the optical amplifier for filtering one or more noise components from the amplified single-mode optical signal; and
a second single-mode circulator coupled to the optical filter for routing the filtered single-mode optical signal to a mode scrambler and coupled to the first single-mode circulator for routing a reflective optical signal received from the mode scrambler to the first single-mode circulator via the single-mode optical fiber.

16. The system of claim 15, wherein the mode scrambler is coupleable to the multi-mode optical fiber for coupling the amplified single-mode optical signal into a plurality of modes of the multi-mode optical fiber.

17. The system of claim 16, wherein the second single-mode circulator comprises a first port coupled to an output of the optical amplifier, a second port connected to the mode scrambler that is connected to the multi-mode optical fiber, and a third port for routing backscatter signaling from the second single-mode circulator to a first port of the single-mode circulator.

18. The system of claim 16, wherein the first single-mode circulator comprises:
- a first port coupled to an optical fiber for receiving the reflective optical signal from the multi-mode optical fiber;
- a second port communicatively coupleable to the distributed sensing interrogator for receiving the single-mode optical signal from the distributed sensing interrogator; and
- a third port coupled to the optical amplifier for routing the single-mode optical signal to the optical amplifier.

19. The system of claim 18, further comprising:
- a multi-mode circulator coupleable to an output of the optical amplifier for routing the amplified single-mode optical signal from the optical amplifier to the multi-mode optical fiber and communicatively coupleable to a first port of the first single-mode circulator for routing the reflective optical signal received from the multi-mode optical fiber to the first port of the single-mode circulator, wherein the multi-mode circulator comprises:
- a first port coupled to the mode scrambler for receiving the multi-mode optical signal;
- a second port communicatively coupleable: to the multi-mode optical fiber for routing the multi-mode optical signal to the multi-mode optical fiber and for receiving the reflective optical signal; and
- a third port coupled to an optical fiber for routing the reflective optical signal to a first port of the single-mode circulator.

* * * * *

UNITED STATES PATENT AND TRADEMARK OFFICE
CERTIFICATE OF CORRECTION

PATENT NO. : 11,085,290 B2
APPLICATION NO. : 16/488206
DATED : August 10, 2021
INVENTOR(S) : Michel Joseph LeBlanc, Jason Edward Therrien and Andreas Ellmauthaler It is certified that error appears in the above-identified patent and that said Letters Patent is hereby corrected as shown below:

In the Claims

Column 16, Line 21, Claim 13, delete "routing, by ti-mode circulator" and replace with --routing, by the multi-mode circulator--.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*